United States Patent
Yahorava et al.

(10) Patent No.: US 10,047,412 B2
(45) Date of Patent: Aug. 14, 2018

(54) GOLD RECOVERY FROM CARBON

(71) Applicant: MINTEK, Randburg (ZA)

(72) Inventors: Volha Yahorava, Randburg (ZA);
Volha Bazhko, Randburg (ZA);
Martha Hendriette Kotze, Randburg (ZA)

(73) Assignee: MINTEK, Randburg (ZA)

( * ) Notice: Subject to any disclaimer, the term of this patent is extended or adjusted under 35 U.S.C. 154(b) by 140 days.

(21) Appl. No.: 14/995,892

(22) Filed: Jan. 14, 2016

(65) Prior Publication Data

US 2016/0208361 A1    Jul. 21, 2016

(30) Foreign Application Priority Data

Jan. 15, 2015   (ZA) .................. 2015/00281
Sep. 30, 2015   (ZA) .................. 2015/07231

(51) Int. Cl.
| | |
|---|---|
| *C22B 11/00* | (2006.01) |
| *C22B 3/42* | (2006.01) |
| *C01G 7/00* | (2006.01) |
| *C22B 11/08* | (2006.01) |
| *C22B 3/00* | (2006.01) |
| *C22B 3/12* | (2006.01) |
| *C22B 3/16* | (2006.01) |

(52) U.S. Cl.
CPC ............ *C22B 11/08* (2013.01); *C01G 7/003* (2013.01); *C22B 3/12* (2013.01); *C22B 3/16* (2013.01); *C22B 3/42* (2013.01); *C22B 11/044* (2013.01); *Y02P 10/214* (2015.11); *Y02P 10/234* (2015.11)

(58) Field of Classification Search
CPC .......... C22B 3/12; C22B 3/42; C22B 11/042; C22B 3/20; C22B 3/24; C22B 3/44; C22B 3/0098; C22B 11/08; C22B 11/044; Y02P 10/234; C01G 7/003
See application file for complete search history.

(56) References Cited

U.S. PATENT DOCUMENTS

| | | | | |
|---|---|---|---|---|
| 3,317,313 A * | 5/1967 | Buggs | .................... | C01G 5/003 423/24 |
| 4,406,752 A * | 9/1983 | Weininger | ................ | C25C 1/20 205/566 |
| 4,778,519 A * | 10/1988 | Pesic | ...................... | C01G 5/003 210/702 |
| 5,134,169 A * | 7/1992 | Green | ...................... | B01J 41/14 210/684 |
| 5,215,575 A * | 6/1993 | Butler | ...................... | C22B 3/04 423/22 |
| 5,916,534 A * | 6/1999 | Butler | ...................... | C22B 3/16 423/22 |
| 2013/0091990 A1* | 4/2013 | Choi | ....................... | C22B 11/04 75/744 |
| 2014/0144788 A1* | 5/2014 | Barton | ...................... | C22B 3/02 205/704 |

FOREIGN PATENT DOCUMENTS

| | | | | | |
|---|---|---|---|---|---|
| GB | 1913-02807 A | * | 2/1914 | ............ | C22B 11/08 |
| GB | 954435 A | * | 4/1964 | | |

* cited by examiner

*Primary Examiner* — George Wyszomierski
*Assistant Examiner* — Tima M McGuthry Banks
(74) *Attorney, Agent, or Firm* — Young & Thompson

(57) ABSTRACT

A method of recovering gold from carbon fines in a resin-in-leach process wherein the fines are contacted with an ion exchange resin, in the presence of a suitable lixiviant, to load gold onto the resin, eluting the gold from the resin using a suitable eluent and recovering the gold from a resulting eluate.

8 Claims, 7 Drawing Sheets

GOLD RECOVERY FROM CARBON

BACKGROUND OF THE INVENTION

This invention relates to the recovery of gold from carbon fines.

Carbon fines are produced when carbon, which is used in a carbon-in-leach (CIL) or carbon-in-pulp (CIP) process for the recovery of gold, is broken. Typically, these fines, loaded to some extent with gold, exit from a last adsorption stage of the process and are then lost.

In some plants the process material is passed through an "adsorbent trap screen" prior to pumping the resultant slurry to a slimes dam. The fine adsorbent which is recovered contains some gold that was loaded in the adsorption circuit. Carbon losses can vary from 10 to 60 g/t of processed ore. This carbon can contain from 100 g to 1500 g of gold per ton.

Gold recovery from carbon fines is normally done by combustion followed by cyanidation of the ash. The combustion process is expensive and inevitably results in some gold losses. Carbon dioxide emissions caused by the combustion process are an adverse environmental factor.

Other processes which have been considered include the following: microwave-augmented ashing of carbon fines followed by cyanidation; elution of gold-containing fines with NaCN at an elevated temperature; and the use of a cyanide solution to slurry the gold-containing fines and leach gold, and then a transfer of the gold from the fines to coarser carbon.

An object of the invention is to provide a process for the recovery of gold from carbon fines at a relatively low temperature, at low cyanide and caustic concentrations, and at atmospheric pressure. Preferably the process should allow for gold recovery to be implemented on site, thereby avoiding the cost of transport to a toll treatment facility.

SUMMARY OF THE INVENTION

The invention provides a method of recovering gold from carbon fines in a resin-in-leach process wherein the fines are contacted with an ion exchange resin in the presence of a suitable lixiviant whereby gold is loaded onto the resin, and the gold-loaded resin is then eluted, using a suitable eluent, whereafter gold is recovered from a resulting eluate.

The recovery of gold from the eluate may be performed using an appropriate technique, for example by using an electrowinning or precipitation technique.

The ion exchange resin may be a resin with TBA groups (tributylamine groups) or any other gold-selective strong base resin.

The lixiviant may be an alkaline cyanide solution e.g. a mixture of NaCN and NaOH.

The elution, after adsorption (loading) of the gold onto the resin, may be done using acidic thiourea or any other suitable eluent.

BRIEF DESCRIPTION OF THE DRAWINGS

The invention is further described by way of examples with reference to the accompanying drawings in which.

DESCRIPTION OF PREFERRED EMBODIMENTS

Figure 1:
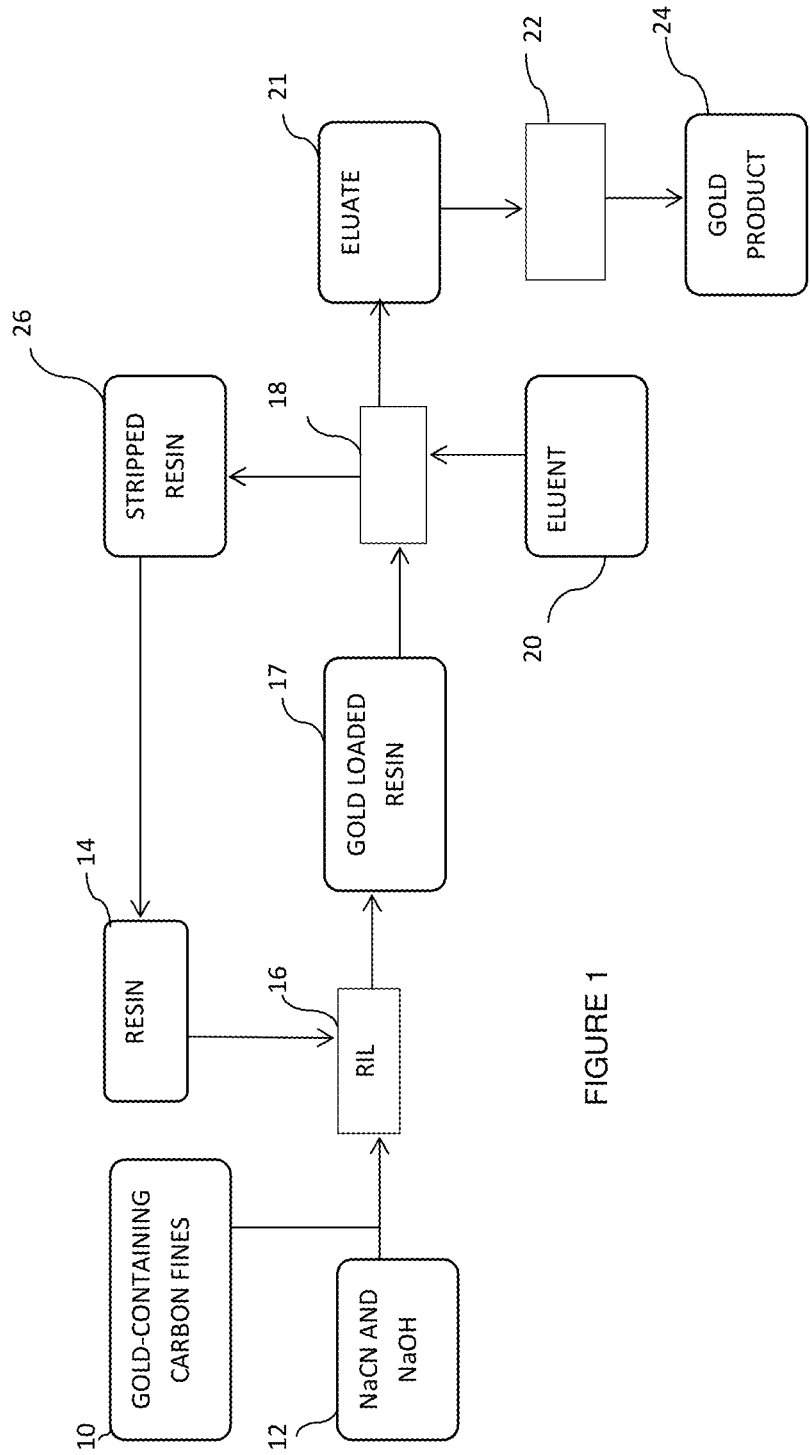
FIG. 1 depicts a flow sheet for the recovery of gold from carbon fines according to the invention.
Figure 2:
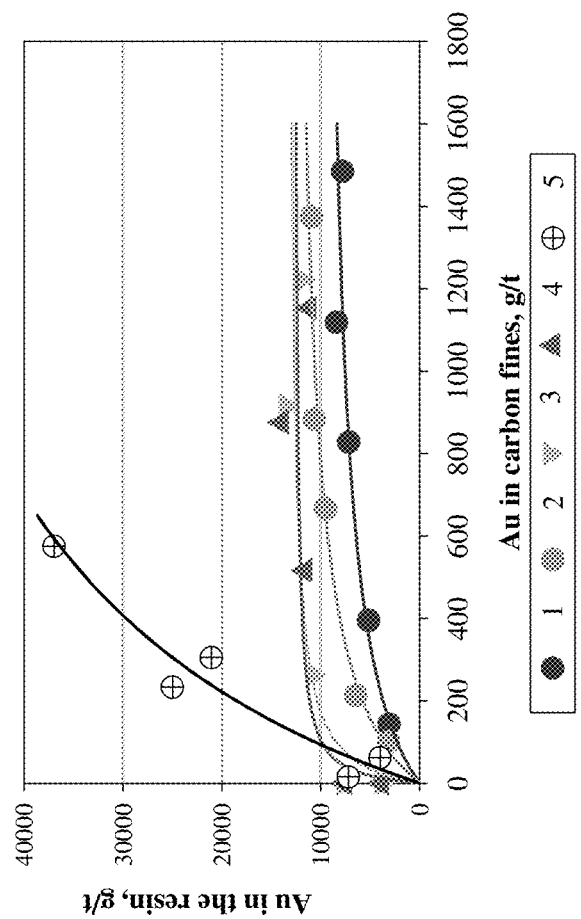
FIG. 2 depicts gold equilibrium distribution isotherms between carbon fines and Dow XZ 91419 resin in an alkaline cyanide medium.

The process of the invention for the recovery of gold from carbon fines, is illustrated in the flowsheet in FIG. 1.

Gold-containing carbon fines 10 are contacted with a lixiviant 12 comprising an alkaline cyanide solution formed from NaCN and NaOH, and with an ion exchange resin 14 in the form of a gold selective strong base resin containing tributylamine or other strong base anion exchange groups, to effect a resin-in-leach process 16 whereby gold is adsorbed onto the resin, forming a gold-loaded resin 17.

The resin 17 is then subjected to an elution step 18 using a suitable eluent 20 such as acidic thiourea. A resulting eluate 21 is subjected to a gold recovery technique 22, eg. electrowinning or precipitation, to produce a gold product 24. A stripped resin 26 is recycled to the resin-in-leach process 16.

Example 1: Gold Recovery from Synthetically Loaded Carbon Fines

Activated carbon (300 g) was contacted with 3 L of a gold (Au) cyanide (CN) solution containing 200 mg/L Au as $Au(CN)_2$, at pH 11. Pre-loading of the carbon was done in a rolling bottle for 24 hours. After loading the carbon was filtered from the solution, dried and pulverized. A feed solution and a barren solution were each submitted for gold analysis by atomic absorption spectroscopy. The loading of the carbon was calculated to be 1759 mg/kg (or g/t).

Five equilibrium isotherms were generated at the conditions specified in Table 1.

TABLE 1

Conditions used for generation of equilibrium isotherms

| Test | $CN^-$, mg/L | NaOH, mg/L | Temperature, ° C. |
|---|---|---|---|
| 1 | 200 | 1 | Ambient |
| 2 | 500 | 1 | Ambient |
| 3 | 1000 | 1 | Ambient |
| 4 | 1000 | 100 | Ambient |
| 5 | 1000 | 100 | 60 |

Carbon loaded with gold was mixed with an alkaline cyanide solution at a solid-to-liquid ratio of 1:4 (20% m/m solids). The "pulp" obtained was contacted with different amounts of a strong base resin with TBA groups (Dow XZ 91419) in ratios specified in Table 2.

TABLE 2

| | Resin-solution-carbon ratios | | |
|---|---|---|---|
| Test | Carbon fines with Au, g | CN liquor, mL | Dow XZ 91419, mL |
| 1 | 10 | 40 | 1 |
| 2 | 10 | 40 | 2 |
| 3 | 10 | 40 | 4 |
| 4 | 10 | 40 | 8 |
| 5 | 10 | 40 | 16 |

After 24 hours of contact in rolling bottles, the resin beads were separated from the pulp and the pulp was filtered to separate carbon fines from the contact liquor. Carbon fines and Dow XZ 91419 resin beads were washed, dried and analysed for gold (detection limit 0.08 g/t). The filtrates were analysed for Au via atomic absorption spectroscopic analysis (AAS) with a detection limit of 0.08 mg/L.

Figure 3:
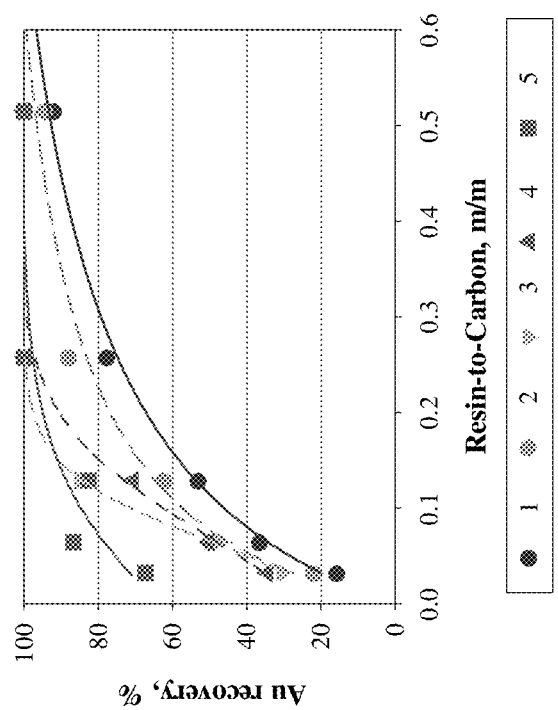
FIG. 3 depicts the percentage of gold recovered from carbon fines as a function of a Dow XZ 91419 resin-to-carbon ratio.

The gold-containing carbon fines were contacted with an alkaline cyanide solution for gold transfer from the loaded carbon fines to a coarse gold-selective Dow XZ 91419 resin. FIG. 3 shows gold distribution between the carbon fines and beads of Dow XZ 91419 resin.

Figure 4:
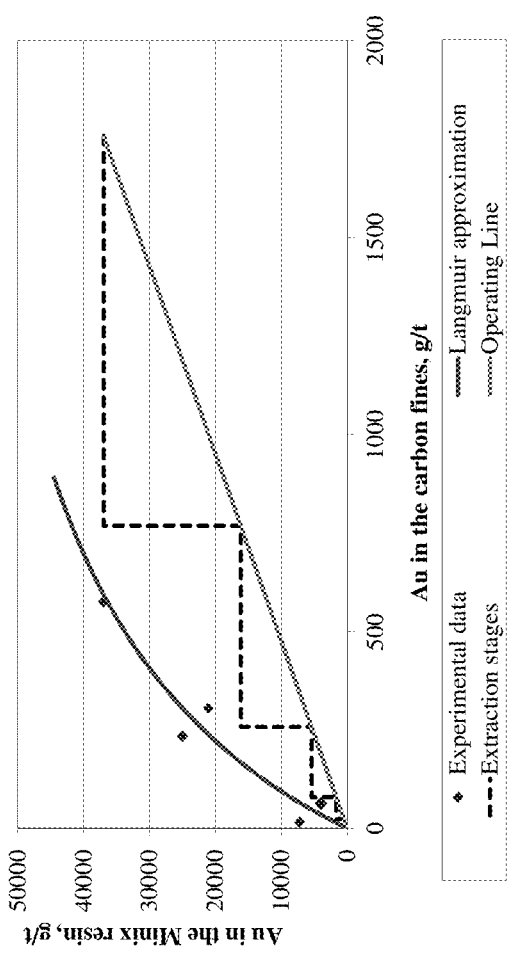
FIG. 4 is a McCabe-Thiele construction for a gold equilibrium distribution isotherm between carbon fines and Dow XZ 91419 resin in 1887 mg/L NaCN and 100 mg/L NaOH solution at 60° C.

The cyanide concentration played an important role in the efficiency of the gold transfer from the carbon to resin. An increase in cyanide concentration in the lixiviant from 200 to 1000 mg/L at the lowest resin-to-carbon ratio tested (~0.03 (m/m)) increased the gold recovery from 15 to 35%, respectively, as shown in FIG. 4.

An increase in free NaOH concentration from 1 to 100 mg/L NaOH did not result in a noticeable improvement of gold recovery from the carbon fines. However, after the temperature was raised to 60° C., the efficiency of gold transfer from the resin to the carbon phase increased from ~50 to >80% at a resin-to-carbon ratio of ~0.06.

Figure 5:
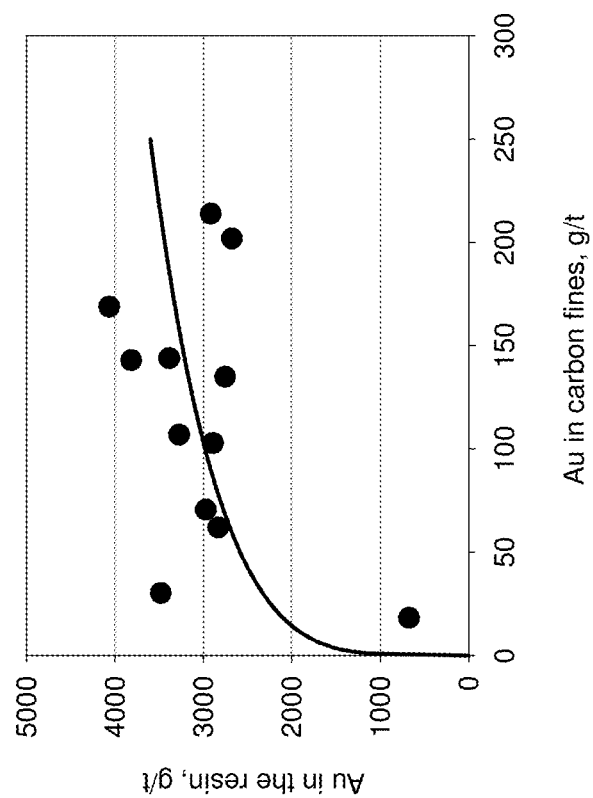
FIG. 5 depicts gold equilibrium distribution between carbon fines and Minix resin in a cyanide media.
Figure 6:
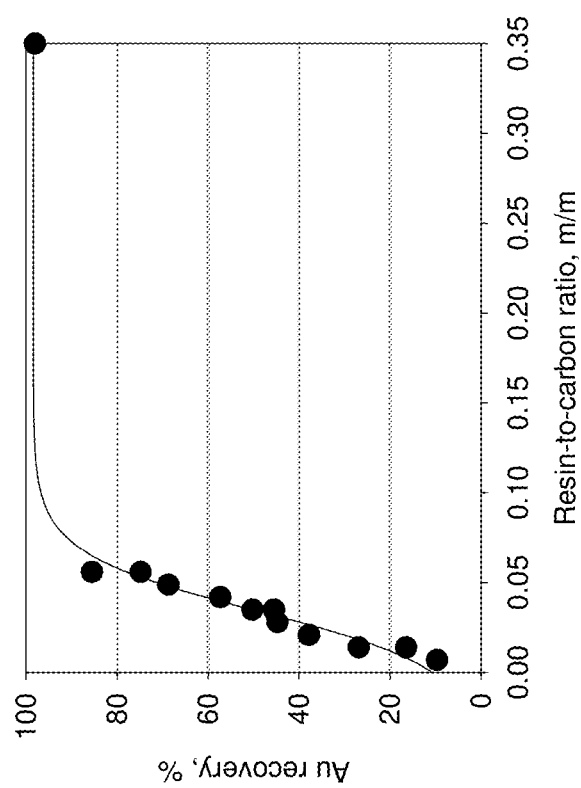
FIG. 6 depicts the gold recovery achieved in 24 hours of contact at different resin-to-carbon ratios.

A McCabe-Thiele construction was done for an equilibrium isotherm generated at optimum conditions determined for the gold recovery from synthetically loaded carbon fines as shown in FIG. 5. Input and output parameters used for and generated from the McCabe-Thiele construction are summarized in Table 3.

TABLE 3

| Input and output parameters of McCabe-Thiele construction | |
|---|---|
| Input parameters | |
| Au in the feed (carbon fines), g/t or mg/kg | 1500* |
| Au in the effluent fines, g/t or mg/kg (>98% recovery targeted) | <30 |
| Au transferred into the resin, g/t or mg/kg | 35000 |
| Au in the eluted/recycled resin, mg/kg | 50 |
| Efficiency of the extraction stage, % | 75 |

TABLE 3-continued

| Input and output parameters of McCabe-Thiele construction | |
|---|---|
| Output parameters | |
| Au recovery achieved | 99 |
| Residual Au in effluent fines, g/t or mg/kg | 15 |
| Number of stages required | 5 |
| Au upgrade | 23 |
| Resin-to-carbon flow, L/kg | 0.13 |
| kg/kg | 0.042 |

*maximum gold content in carbon fines as per literature [1], [2].

The method of the invention was shown to be superior to known alternatives in the following respects:
1. a lower amount of energy is required in comparison to combustion or ashing;
2. lower cyanide concentrations (1.8 g/L NaCN or 1 g/L CN) are required compared to elution of the fines with 20 g/L NaCN at an elevated temperature of 120-140° C.;
3. a relatively low resin-to-carbon ratio is required for gold transfer from the fines in comparison with carbon-to-carbon process; and
4. an improved overall gold recovery, in excess of 98%, can be achieved;

Example 2: Gold Recovery from Actual Carbon Fines

A sample of carbon waste, representing typical carbon waste from a South African gold mine, was analysed. The sample contained 215 g/t Au and a significant amount of impurities, especially Si (1.26%), Al (1.8%), Fe (1.4%) and Ca (6.81%). The composition of the sample is specified in Table 4.

TABLE 4

| Chemical composition of a typical sample of carbon waste from a South African mine (g/t) | | | | | | | | | |
|---|---|---|---|---|---|---|---|---|---|
| Au | Mg | Al | Si | Ca | Ti | Fe | Ni | Cu | Zn |
| 215 | 525 | 18450 | 12600 | 68100 | 1050 | 13650 | 1100 | 925 | 1450 |

The sample was milled down to 100% passing 125 μm, and was mixed with cyanide alkaline solution containing 1 g/L cyanide as NaCN and 0.1 g/L NaOH at a solid to liquid ratio of 1:4 (20% w/w solids). The "pulp" obtained was contacted with different amounts of a strong base gold selective resin, Minix, at 60° C. After 24 hours of contact in rolling bottles, the resin beads were separated from the carbon pulp, and the carbon was filtered. The carbon fines and the Minix resin beads were washed, dried and then analysed for Au. The filtrates were analysed for Au via AAS.

Gold was efficiently transferred from the carbon fines onto the resin. A minimum residual gold concentration detected in the carbon was 18 g/t, meaning 98% overall Au recovery. The average maximum resin loading achieved was about 3430 g/t, giving a gold upgrade of 16 times (from 214 g/t in the feed carbon).

The Minix resin co-loaded a number of impurities present in the carbon as shown in Table 5. As a result, the gold upgrade achieved with the real carbon fines is lower compared to the results obtained using a synthetically loaded carbon.

TABLE 5

Au and impurities on carbon and resin

|  | Al | Ca | Cu | Fe | Mg | Ni | Si | Au | Co | Zn |
|---|---|---|---|---|---|---|---|---|---|---|
| Carbon feed, mg/kg | 18450 | 68100 | 925 | 13650 | 5300 | 1100 | 126000 | 215 | n/d | 1450 |
| Resin (8 ml/kg)*, g/t | n/d | 5680 | 960 | 2720 | 249 | 11280 | n/d | 2523 | 249 | 9120 |

*Loading was calculated based on eluate analysis

Most of the impurities co-loaded with gold could be selectively eluted prior to eluting the gold by 1 M $H_2SO_4$. These impurities could be used as an additional revenue source.

Figure 7:
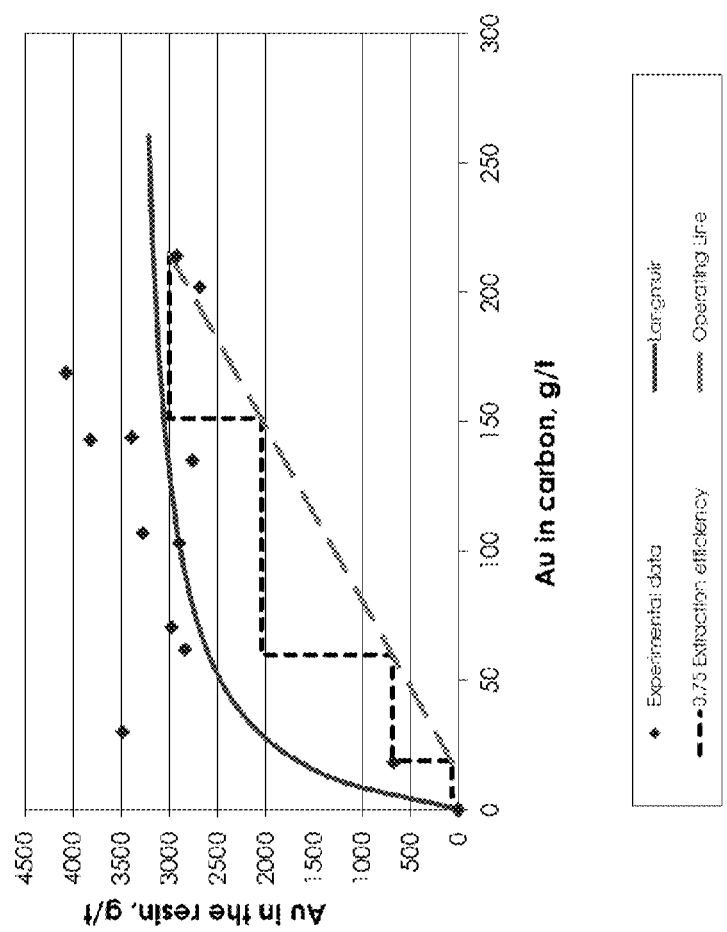
FIG. 7 is a McCabe-Thiele construction for an actual carbon fines sample.

Input and output parameters used for, and generated from, the McCabe-Thiele curves shown in FIG. 7 are summarized in Table 6.

TABLE 6

Input and output parameters of McCabe-Thiele construction

| Input | |
|---|---|
| Au in the feed (carbon fines), g/t or mg/kg | 215 |
| Au in the effluent fines, g/t or mg/kg (>98% recovery targeted) | <15 |
| Au transferred into the resin, g/t or mg/kg | 3000 |
| Au in the eluted/recycled resin, mg/kg | 25 |
| Efficiency of the extraction stage, % | 75 |
| Output parameters | |
| Au recovery achieved | 98 |
| Residual Au in effluent fines, g/t or mg/kg | 15 |
| Number of stages required | 4 |
| Au upgrade | 14 |
| Resin-to-carbon flow, L/kg | 0.023 |
| kg/kg | 0.067 |

The results obtained show that the technology can be applied successfully in the treatment of real carbon wastes. Potentially >95% of gold can be recovered in a counter-current recovery process.

The invention claimed is:

1. A method for recovering gold from carbon fines in a resin-in-leach process, comprising contacting the carbon fines with a gold-selective strong base ion exchange resin, having tributylamine groups, in the presence of a suitable lixiviant, comprising an alkaline cyanide solution whereby gold is loaded onto the resin.

2. The method according to claim 1, wherein the lixiviant is a mixture of NaCN and NaOH.

3. The method according to claim 2, wherein the cyanide solution has a cyanide concentration of 200 mg/L to 1000 mg/L.

4. The method according to claim 1, wherein the method is carried out at a temperatures ranging from ambient temperature to 60° C.

5. The method according to claim 1, further comprising eluting the gold-loaded resin, using a suitable eluent, whereafter gold is recovered from a resulting eluate.

6. The method according to claim 5, wherein the eluent is an acidic thiourea solution.

7. The method according to claim 6, wherein the gold is recovered from the eluate by an electrowinning or precipitation technique.

8. The method according to claim 5, wherein the gold is recovered from the eluate by an electrowinning or precipitation technique.

* * * * *